United States Patent [19]

Rawlings et al.

[11] Patent Number: 4,487,881
[45] Date of Patent: Dec. 11, 1984

[54] IMPACT IMPROVEMENT OF REINFORCED POLYCARBONATE/ABS BLENDS

[75] Inventors: Herbert L. Rawlings, New Martinsville, W. Va.; Gerard E. Reinert, McMurray, Pa.

[73] Assignee: Mobay Chemical Corporation, Pittsburgh, Pa.

[21] Appl. No.: 538,301

[22] Filed: Oct. 3, 1983

[51] Int. Cl.$^3$ .......................... C08L 69/00; C08K 3/40
[52] U.S. Cl. ..................... 524/504; 524/494; 525/67; 525/69
[58] Field of Search ............... 525/67, 146; 524/504, 524/494

[56] References Cited

U.S. PATENT DOCUMENTS

| 3,130,177 | 4/1964 | Grabowski | 260/45.5 |
|---|---|---|---|
| 3,162,695 | 12/1964 | Grabowski | 260/873 |
| 3,852,393 | 12/1974 | Furukawa et al. | 260/873 |
| 3,880,783 | 4/1975 | Serini et al. | 260/3 |
| 3,951,903 | 4/1976 | Shaffer | 260/37 |
| 3,966,842 | 6/1976 | Ludwig et al. | 260/873 |
| 4,122,130 | 10/1978 | Fava | 260/873 |
| 4,172,103 | 10/1979 | Serini et al. | 525/76 |
| 4,204,047 | 5/1980 | Margotte et al. | 525/67 |
| 4,205,141 | 5/1980 | Liebig et al. | 525/67 |
| 4,218,544 | 8/1980 | Henton | 525/67 |
| 4,226,950 | 10/1980 | Holub et al. | 525/67 |
| 4,297,446 | 10/1981 | Lindner et al. | 525/66 |
| 4,299,929 | 11/1981 | Sakano et al. | 525/67 |
| 4,302,378 | 11/1981 | Lindner et al. | 260/31.6 |
| 4,367,310 | 1/1983 | Henton | 525/67 |

FOREIGN PATENT DOCUMENTS 55-157648  5/1979  Japan .
1253226  11/1971  United Kingdom .

Primary Examiner—Theodore E. Pertilla
Attorney, Agent, or Firm—Gene Harsh; Lawrence S. Pope; Aron Preis

[57] ABSTRACT

The present invention is directed to a thermoplastic molding composition comprising a blend of a thermoplastic aromatic polycarbonate resin, a graft elastomer, a polyanhydride and glass fibers, said composition is characterized by its improved impact performance.

13 Claims, No Drawings

IMPACT IMPROVEMENT OF REINFORCED POLYCARBONATE/ABS BLENDS

FIELD OF THE INVENTION

The present invention relates to a blend of thermoplastic polymers and, more particularly, to a thermoplastic glass reinforced composition comprising a graft elastomer, polycarbonate and a polyanhydride resin.

SUMMARY OF THE INVENTION

The present invention is directed to a thermoplastic molding composition comprising a blend of a thermoplastic aromatic polycarbonate resin, a graft elastomer, a polyanhydride and glass fibers, said composition is characterized by its improved impact performance.

BACKGROUND OF THE INVENTION

Blends of ABS and polycarbonate resins were disclosed in U.S. Pat. Nos. 3,130,177 and 3,852,393 and although found suitable for many end uses, the level of impact resistance presented a drawback for some important markets. Similar blends are disclosed in British Pat. No. 1,253,226 whereas U.S. Pat. No. 3,162,695 is noted for its teaching respecting a blend of polycarbonate and a graft copolymer of methylmethacrylate and styrene monomers polymerized in the presence of a butadiene styrene latex. Copolymers of maleic anhydride and α-olefin have been disclosed as impact modifiers of glass reinforced polycarbonates in copending application Ser. No. 258,817, filed Apr. 29, 1981, now U.S. Pat. No. 4,420,584. The art is further noted to include U.S. Pat. No. 3,966,842 directed to compositions comprising polycarbonate and a diene rubber-containing styrene/maleic anhydride.

Also of interest, the art is noted to include U.S. Pat. Nos. 4,172,103 and 3,880,783, both describing mixtures of special polycarbonates with other thermoplastic resins which later include copolymers of maleic acid anhydride. Also, U.S. Pat. No. 4,205,141, which discloses mixtures of polycarbonates with copolymers from styrene acrylonitrile and maleic acid anhydride, and U.S. Pat. No. 4,204,047, which discloses mixtures of polycarbonates with ABS which may optionally contain an N-substituted maleic imide and with a copolymer which has copolymerized an N-substituted maleic imide, as well as U.S. Pat. No. 3,951,903 which describes the addition to polycarbonate resin of acid anhydrides and optionally glass fibers and U.S. Pat. No. 4,122,130, which discloses a blend of polycarbonate and the imido derivative of rubber-modified styrene maleic anhydride.

DETAILED DESCRIPTION OF THE INVENTION

The Graft Elastomer

The graft elastomer suitable in the present context is characterized in that its rubber core is substantially of polybutadiene and that its grafted phase comprises styrene and acrylonitrile, and further in that the polybutadiene content of the graft elastomer is at least 5, preferably 5 to 60%, relative to the weight of the graft elastomer. In these grafts, a monomer mixture of styrene and acrylonitrile is graft polymerized onto the prepolymerized rubber core; crosslinking of the rubber core in an optional feature of the graft elastomer of the invention.

Suitable rubbers are polybutadiene, butadiene-styrene copolymers having up to 30% by weight of copolymerized styrene, copolymers of butadienes and acrylonitrile with up to 20% by weight of acrylonitrile and copolymers of butadiene with up to 20% by weight of a lower alkyl ester of an acrylic or methacrylic acid (for example, methylacrylate, ethylacrylate, methylmethacrylate and ethylmethacrylate).

The preparation of graft elastomers of the type suitable in the present context has been described in the art, for instance, in U.S. Pat. No. 3,238,275 and in U.S. Pat. No. 3,919,353, both incorporated by reference herein.

Essentially, the molecules of acrylonitrile-butadiene-styrene (ABS) graft elastomers consist of two or more polymeric parts of different compositions chemically united. The graft elastomer may be prepared by polymerizing at least one conjugated diene, such as butadiene, or a conjugated diene with a monomer polymerizable therewith, such as noted above to provide a backbone (a core) with subsequent polymerization of at least one grafting monomer, and peferably two, in the presence of a prepolymerized backbone to complete the graft elastomer.

The backbone, as mentioned, is preferably a conjugated diene polymer or copolymer such as polybutadiene, a butadiene-styrene, butadiene-acrylonitrile or the like.

A specific conjugated diene monomer which may be utilized in preparing the backbone of the graft elastomer is generically described by the formula:

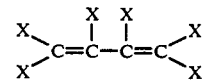

wherein X may be selected from the group consisting of hydrogen, alkyl groups containing from 1 to 5 carbon atoms, chloro and bromo. Examples of dienes that may be used are butadiene; isoprene; 1,2-heptadiene; methyl-1,3-pentadiene; 2,3-dimethyl-1,3-butadiene; 1,3-pentadiene; 2-methyl-3-ethyl-1,3-butadiene; 2-ethyl-1,3-pentadiene; 1,3- and 2,4-hexadiene; chloro- and bromo-substituted butadienes such as dichlorobutadiene, bromobutadiene, chloroprene, dibromobutadiene, mixtures thereof and the like. The preferred conjugated diene utilized herein is butadiene.

The first monomer or group of monomers polymerized in the presence of the prepolymerized backbone are preferably monovinyl aromatic hydrocarbons. The monovinyl aromatic monomers utilized are generically described by the formula:

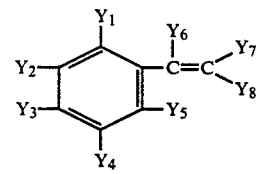

wherein $Y_1$-$Y_8$ independently are selected from the group consisting of hydrogen, alkyl groups containing from 1 to 5 carbon atoms, chloro and bromo. Examples of the monovinyl aromatic compounds and substituted monovinyl aromatic compounds that may be used are styrene and other vinyl-substituted aromatic compounds including alkyl-, cycloalkyl-, aryl-, alkaryl-, aralkyl-, alkoxy-, arloxy- and other substituted vinyl aromatic compounds. Examples of such compounds are 3-methylstyrene, 3,5-diethylstyrene and 4-n-propylstyrene, α-chlorostyrene, vinyltoluene, α-bromostyrene, chlorophenylethylenes, dibromophenylethylenes, tetrachlorophenylethylenes, 1-vinylnaphthalene, 2-vinylnaphthalene, mixtures thereof and the like. The preferred monovinyl aromatic hydrocarbon used herein is styrene; especially preferred is the embodiment wherein said styrene is free from 60-methyl styrene.

The second group of monomers that are polymerized in the presence of the prepolymerized backbone are acrylonitrile and/or substituted acrylonitrile. The acrylonitrile and substituted acrylonitrile are described generically by the formula

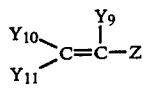

wherein $Y_9$–$Y_{11}$ independently are selected from the group consisting of hydrogen, alkyl groups containing from 1 to 5 carbon atoms, chloro and bromo and Z is selected from the group consisting of cyano and carbalkoxy wherein the alkyl group of the carbalkoxy group contains from 1 to about 12 carbon atoms. Examples are acrylonitrile, α-chloroacrylonitrile, β-chloroacrylonitrile, α-bromoacrylonitrile and β-bromoacrylonitrile. The preferred acrylic monomer used herein is acrylonitrile.

In the preparation of the graft elastomer, the conjugated diolefin polymer or copolymer, preferably 1,3-butadiene polymer or copolymer, comprises from about 60% by weight to about 5% by weight of the total graft elastomer composition and the monomers polymerized in the presence of the backbone, preferably styrene and acrylonitrile, comprise from about 40 to about 95% by weight of the total graft elastomer composition.

The second group of grafting monomers, exemplified by acrylonitrile, ethyl acrylate or methyl methacrylate preferably comprise from about 10% to about 40% by weight of the total graft elastomer composition and the monovinyl aromatic hydrocarbon exemplified by styrene comprises from about 30 to about 90% by weight relative to the weight of the graft elastomer.

ABS graft elastomers suitable in the present context may be prepared by either bulk suspension polymerization or by emulsion polymerization, a description of both is provided in U.S. Pat. Nos. 3,751,526, 3,758,640, 3,981,944, 3,950,455 and 3,852,393, all incorporated herein by reference.

Glass Fibers

The preferred glass fibers are of low alkali content and fibrous glass filaments of lime aluminum borosilicate glass (E glass) are most preferred. Other glass fibers are low soda content (C glass) may also be used. The alkali oxide content of the glass is preferably less than 2.0 percent by weight. Neither the length nor the diameter of the fibers is critical to the present practice although the preferred average length is between 0 and 800 microns and the average diameter is between 8 and 15 microns. The fiber reinforcement may be bundled or in a yarn form or in a form of ropes or rovings or mats. Chopped strands, rovings or short fibers, however, are most convenient to use.

The Polycarbonate Resin

The polycarbonate resins useful in the practice of the invention are homopolycarbonates, copolycarbonates and terpolycarbonates or mixtures thereof. The polycarbonate resins generally have molecular weights of 10,000–200,000 (weight average molecular weight) preferably 20,000–80,000, and are additionally characterized by their melt flow of 1–24 gm/10 min. at 300° C. per ASTM D-1238. These polycarbonate resins may be prepared, for example, by the known diphasic interface process from phosgene and dihydroxy compounds by polycondensation (see the monograph H. Schnell, *Chemistry and Physics of Polycarbonates*, Interscience Publishers, New York, 1964, incorporated herein by reference.

In the present context, dihydroxy compounds suitable for the preparation of the polycarbonates of the invention conform to the structural formula (1) or (2)

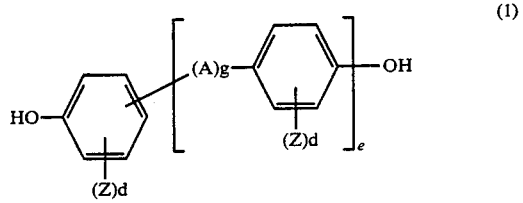

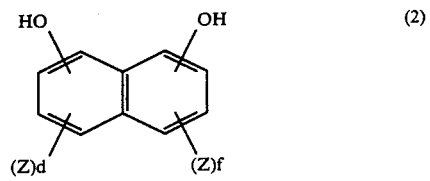

wherein

A denotes an alkylene group with 1 to 8 carbon atoms, an alkylidene group with 2 to 8 carbon atoms, a cyloalkylene group with 5 to 15 carbon atoms, a cycloalkylidene group with 5 to 15 carbon atoms, a carbonyl group, an oxygen atom; S, —SO— or —SO$_2$— radical; a radical of the general formula

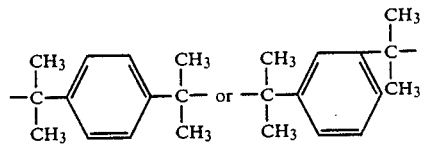

g denotes the number 0 or 1;
e denotes the number 0 or 1;
Z denotes F, Cl, Br or C$_1$–C$_3$ alkyl and if several Z radicals are substituents in one aryl radical, they may be identical or different;
d denotes 0 or an integer of from 1 to 4; and
f denotes 0 or an integer of from 1 to 3.

Among the useful dihydroxy compounds in the practice of the invention are hydroquinone, resorcinol, bis-(hydroxyphenyl)-alkanes, bis-(hydroxyphenyl)-cycloalkanes, bis-(hydroxyphenyl)-ethers, bis-(hydroxyphenyl)-ketones, bis-(hydroxyphenyl)-sulfoxides, bis-(hydroxyphenyl)-sulfones and α,α-bis-(hydroxyphenyl)-diisopropyl-benzenes. These and further suitable aromatic dihydroxy compounds are described, for example, in U.S. Pat. Nos. 3,028,365; 2,999,835; 3,148,172; 3,271,368; 2,991,273; 3,271,367; 3,280,078; 3,014,891 and 2,999,846 (all incorporated herein by reference). German Offenlegungsschriften (German Published Specifications) Nos. 1,570,703; 2,063,050; 2,063,052; 2,211,956 and 2,211,957, in French Patent Specification No. 1,561,418 and in the monograph, H. Schnell, *Chemistry and Physics of Polycarbonates*, Interscience Publishers, New York, 1964. Further examples of suitable bisphenols are 2,2-bis-(4-hydroxyphenyl)-propane (bisphenol A), 2,4-bis-(4-hydroxyphenyl)-2-methylbutane, 1,1-bis-(4-hydroxyphenyl)-cyclohexane, α,α-bis-(4-hydroxyphenyl)-p-diisopropylbenzene, 2,2-bis-(3-chloro-4-hydroxyphenyl)-propane, hydroxybenzophenone and 4,4'-sulfonyl diphenol.

The most preferred bisphenol is 2,2-bis-(4-hydroxyphenyl)-propane (bisphenol A).

The polycarbonates of the invention may entail in their structure, units derived from one or more of the suitable bisphenols.

The preparation of polycarbonate resins may be carried out in accordance with any of the processes known in the art, for example, by the interfacial polycondensation process, polycondensation in a homogeneous phase or by transesterification.

The suitable processes and the associated reactants, catalysts, solvents and conditions are known in the art and have been described, inter alia, in German Pat. Nos. 1,046,311 and 962,274 and in U.S. Pat. Nos. 3,248,414; 3,153,008; 3,215,668; 3,187,065; 3,028,365; 2,999,846; 2,999,835; 2,964,974; 2,970,137; 3,912,638 and 1,991,273.

In the preparation of the polycarbonate resins of the invention, monofunctional reactants such as monophenols may be used in order to limit their respective molecular weights. Also, branching agents may be employed. Branching may be obtained by the incorporation of small amounts, preferably of between about 0.05 and 2.0 mol percent (relative to diphenols employed), of trifunctional or more than trifunctional compounds, especially compounds having three or more phenolic hydroxyl groups. Polycarbonates of this type are described, for example, in German Offenlegungsschriften (German Published Specifications) Nos. 1,570,533; 1,595,762; 2,116,974 and 2,113,347, British Specification No. 1,079,821 and U.S. Pat. No. 3,544,514 (incorporated herein by reference).

Some examples of compounds with three or more than three phenolic hydroxyl groups which can be used are phloroglucinol, 4,6-dimethyl-2,4,6-tri-(4-hydroxyphenyl)-heptane, 2,4,6-trimethyl-2,4,6-tri-(4-hydroxyphenyl)-heptane, 1,4,5-tri-(4-hydroxyphenyl)-benzene, 1,1,1-tri-(4-hydroxyphenyl)-ethane, tri-(4-hydroxyphenyl)-phenylmethane, 2,2-bis-[4,4-bis-(4-hydroxyphenyl)-cyclohexyl]-propane, 2,4-bis-(4-hydroxyphenylisopropyl)-phenol, 2,6-bis-(2-hydroxy-5'-methylbenzyl)-4-methylphenol, 2-(4-hydroxyphenyl)-2-(2,4-dihydroxyphenyl)-propane, hexa(4-(4-hydroxyphenylisopropyl)-phenyl)-orthoterephthalic acid ester, tetra-(4-hydroxyphenyl)-methane, tetra-(4-(4-hydroxyphenylisopropyl)-phenoxy)-methane and 1,4-bis-((4',4"-dihydroxytriphenyl)-methyl)-benzene. Some of the other trifunctional compounds are 2,4-dihydroxy benzoic acid, trimesic acid, cyanuric chloride and 3,3-bis-(4-hydroxyphenyl)-2-oxo-2,3-dihydroindole.

Among the resins suitable in the practice of the invention are included phenolphthalein based polycarbonate, copolycarbonates and terpolycarbonates such as are described in U.S. Pat. Nos. 3,036,036 and 4,210,741, both incorporated by reference herein.

The Polyanhydride Resins

The polyanhydride resins suitable in the practice of the present invention are characterized by their structural formula:

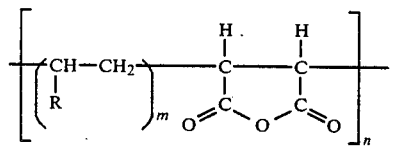

where

R is a pendant alkyl radical having 6 to 28 carbon atoms, and most preferably, from about 14 to 16 carbon atoms, n is an integer of from 1 to 200, and m is an integer of from 1 to 3.

In the most preferred embodiment, n is about 145 and m is 1. Essentially, the polyanhydride resin is a copolymer of maleic anhydride and an α-olefin, the preparation of which copolymer is described in U.S. Pat. No. 3,586,659, herein incorporated by reference. Examples of olefin compounds or mixtures of olefins suitable for forming the polyanhydride component of the composition include: ethylene, 1-propane, 1-decane, 1-butene, 1-undecene, 1-isobutylene, 1-hexene, 1-dodecene, 1-pentene, 1-tridecene, 1-heptene, 1-octene, 1-tetradecene, 1-octadecene, 1-nonadecene, styrene, 1-nonene and mixtures thereof.

The copolymerization procedure may involve contacting the olefinic compound with the maleic anhydride in a suitable solvent in the presence of a catalyst. The molar ratio of the mono-α-olefin to maleic anhydride is desirably between about 1:1 and 3:1.

The preferred polyanhydride suitable in the practice of the invention is a copolymer of 1-octadecene and maleic anhydride of a 1:1 molar ratio is available from Gulf Oil Chemical Company under the trade name PA-18. Typically, PA-18 is further characterized by its properties shown in the table below:

| | |
|---|---|
| Color/form | White powder |
| Molecular weight | 50,000 |
| Specific gravity | 0.97 |
| Melting point range | 110–120 |
| Inherent viscosity[1] | 0.10–0.13 |
| Viscosity at 150° C. (cps) | 20,000 |
| at 160° C. (cps) | 8,000 |
| Anhydride equivalent, meg/g | 3.10–3.25 |
| Neutralization equivalent, meg/g | 4.83–5.53 |
| Anhydride content, wt. % | 15–23 |
| Acid content, wt. % | 5–10 |
| Volatiles, % | <1 |
| Residual monomer | <3 |
| Thermal stability at 250° C. (wt. loss %) | 1 |
| at 300° C. (wt. loss %) | 3 |
| at 350° C. (wt. loss %) | 10 |
| at 400° C. (wt. loss %) | 23 |

[1] 5 gm/100 ml in methylisobutyl ketone at 77° F.

In a yet additional embodiment of the invention, an imide derivative of the polyanhydride is used. That derivative conforms to the structural formula:

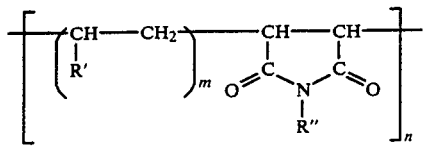

where R' denotes a pendant phenyl or substituted phenyl or an alkyl radical having 6 to 28, preferably 14 to 16 carbon atoms, R" denotes an aryl radical of 6 to 12 carbon atoms or an aliphatic radical of 1 to 30 carbon atoms, m is an integer of from 1 to 3 and n is an integer of from 1 to 200, preferably about 145.

The imide derivative may be prepared as described below.

Four liters of dry DMF (distilled over CaO) and aniline (223 gm) were charged into a three-necked reaction flask. The solution is stirred concurrent with $N_2$ sparging for about 15 minutes to remove oxygen. A charge of two liters of dry DMF and PA-18 (453 gms) is added to the reaction flask which is maintained at about 0° C. After about one hour, the reaction is heated to reflux to effect cyclization of the polyamic acid to the imide. After refluxing for about six hours, the reaction vessel is cooled, DMF is stripped and the polyimide precipitated and washed. Formation of the imide was confirmed by NMR and IR.

The Blend

In the practice of the invention blends comprising polycarbonate, graft elastomer, glass fibers and polyanhydride resin (or its imidized version) are intimately mixed to form a homogenous composition using known mixing devices such as kneader mills or single (or twin) screw extruders.

The compositions of the invention may contain additives and agents such as are known in the art to impart certain properties in thermoplastic molding compositions. Among these are plasticizers, heat and hydrolytic stabilizers, pigments, fillers, reinforcement agents and flame retardants of various types.

The components of the blend, in accordance with the invention, are preferably present in the following amounts, expressed as percent by weight relative to the weight of the blend:

Glass fibers 5 to 50%, preferably 10 to 30%;
Resinous components (graft elastomer + polycarbonate resin) 95 to 50, preferably 90 to 70%;
Polyanhydride 0.1 to 5%, preferably 0.3 to 3%, relative to the weight of the resinous component.

The resinous components, namely, graft elastomer and polycarbonate resin, may be present in the blend in a weight ratio of between 80/20 to about 20/80, preferably 70/30 to about 30/70, of polycarbonate to graft elastomer.

The invention is further illustrated but is not intended to be limited by the following examples.

EXAMPLES

Examples 1-4

Molding compositions comprising the blends of the invention were prepared as follows.

The resinous components and the anhydride were first blended and the glass fibers were then added. Extrusion was carried out using a 1½" Waldron Hartig extruder, 60 rpm, at a temperature profile of 520°/480°/450° F. and a die temperature of 510° F., using no screens. The components used in the series of examples described below were:

Merlon M-50, a bisphenol A based homopolycarbonate characterized in that its melt flow rate is about 3.0 to 5.9 gms/10 min., a commercial product of Mobay Chemical Corporation.

The ABS resin is characterized in that its chemical makeup entailed 8% polybutadiene, 13% acrylonitrile and 79% styrene.

The glass fibers were OCF 419AA-3/16" from Owens Corning Fiberglas.

The polyanhydride was PA-18 from Gulf Oil Chemical Company.

The compositions all contain equal weights of polycarbonate and ABS resins and about 25 percent of glass fibers, the percent being relative to the weight of the resins (polycarbonate plus ABS). The added polyanhydride is indicated to be in phr relative to the weight of the resin.

| Example | 1 | 2 | 3 | 4 |
|---|---|---|---|---|
| Added polyanhydride, phr | — | 0.99 | 1.91 | 3.9 |
| Impact strength, Izod, ⅛", notched, J/m | 76 | 124 | 112 | 89 |
| Flexural modulus, GPa | 5.7 | 5.5 | 5.5 | 5.3 |
| Flexural strength, MPa | 120 | 84 | 82 | 80 |
| HDT at 264 psi, °C. | 120.2 | 110.0 | 109.5 | 108.8 |

Examples 5-10

Compositions in accordance with the invention containing 10 percent of glass fibers, were prepared and tested as shown below. The ingredients were tumble blended, prior to extrusion, into a single feed stock. The components were melt homogenized on a 1½", 24/1 single-screw, non-vented extruder equipped with a 2.75:1 compression ratio screw featuring 4 rows of mixing pins in the metering zone. The barrel was maintained at (rear to front) 530°/470°/450° F. The die, a 6-hole standing die, was maintained at 510° F. In the compositions described below, the weight ratio between ABS to the polycarbonate was 52/48; the polycarbonate resin that was used in the course of these experiments was M-50 regrind containing about 4% ABS.

| | 5[1] | 6[1] | 7[1] | 8[1] | 9[2] | 10[2] |
|---|---|---|---|---|---|---|
| Added polyanhydride, % | 0 | 0.8 | 1.5 | 2.5 | 0 | 1.5 |
| Impact strength, ⅛" Izod | | | | | | |
| notched J/m | 60 | 50 | 60 | 56 | 91 | 135 |
| unnotched J/m | 410 | 420 | 460 | 510 | 465 | 645 |
| Tensile yield, MPa | 71 | 61 | 55 | 48 | — | — |
| Elongation, % | 2 | 3 | 5 | 7 | — | — |
| HDT at 264 psi, °C. | 121 | 121 | 119 | 120 | 110 | 109 |

[1] an ABS resin characterized in that it contains about 16-18% polybutadiene and about 23-24% acrylonitrile and in that its styrene phase (app. 58-61%) contains (about 23% relative to the resin) α-methyl styrene, available commercially from Borg-Warner as Blendex 702.

[2] ABS Blendex 206 characterized in its chemical makeup which entails 60% styrene, 22% acrylonitrile and 18% polybutadiene.

Although the invention has been described in detail in the foregoing, such detail is solely for the purpose of illustration. Variations can be made in the invention by those skilled in the art without departing from the spirit or scope of the invention except as it may be limited by the claims.

What is claimed is:

1. A thermoplastic molding composition comprising a blend of (a) an aromatic polycarbonate, (b) a graft elastomer which is characterized in having a rubber core substantially of polybutadiene and a graft phase which comprises styrene and acrylonitrile and in that its butadiene content is at least 5% relative to the weight of said graft elastomer, (c) a polyanhydride resin selected from the group consisting of (i) a linear copolymer of maleic acid anhydride and an α-olefin of the general formula

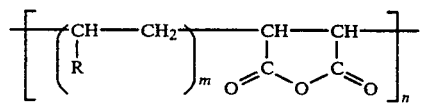

wherein R is a $C_{10}-C_{28}$ alkyl radical, n is from 1 to 200, and m is 1 to 3, and (ii) a linear copolymer of an imidized derivative of maleic acid anhydride and an α-olefin of the general formula

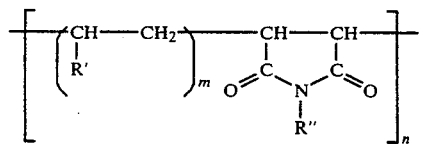

wherein R' is a phenyl or a substituted phenyl radical or a $C_6-C_{28}$ alkyl, R" is an aryl radical having 6 to 12 carbon atoms or an aliphatic radical having 1 to 30 carbon atoms, n is from 1 to 200 and m is 1 to 3 and (d) glass fibers.

2. The composition of claim 1 wherein said blend is characterized in that the weight ratio of said (a) to said (b) is between 80/20 and about 20/80.

3. The composition of claim 1 wherein said (d) is present at about 5 to about 50 percent relative to the total weight of said (a) plus said (b).

4. The composition of claim 1 wherein said (c) is present at an amount of 0.1 to about 5 percent relative to the total weight of said (a) plus said (b).

5. The composition of claim 1 wherein said (b) is an ABS resin.

6. The composition of claim 1 wherein said R is a $C_{16}$ alkyl.

7. The composition of claim 1 wherein said R' is a $C_{16}$ alkyl.

8. The composition of claim 5 wherein said ABS is α-methyl styrene free.

9. The molding composition of claim 1 wherein said R' is a $C_6-C_{28}$ alkyl.

10. A thermoplastic molding composition consisting essentially of (a) an aromatic polycarbonate, (b) a graft elastomer which is characterized in having a rubber core substantially of polybutadiene and a graft phase which comprises styrene and acrylonitrile and in that its butadiene content is at least 5% relative to the weight of said graft elastomer, (c) a polyanhydride resin selected from the group consisting of (i) a linear copolymer of maleic acid anhydride and an α-olefin of the general formula

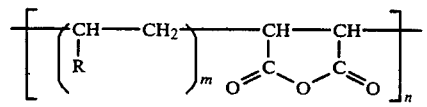

wherein R is a $C_{10}-C_{28}$ alkyl radical, n is from 1 to 200, and m is 1 to 3, and (ii) a linear copolymer of an imidized derivative of maleic acid anhydride and an α-olefin of the general formula

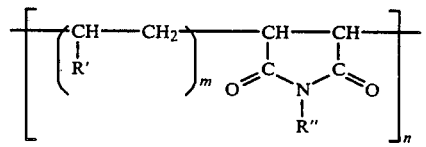

wherein R' is a phenyl or a substituted phenyl radical or a $C_6-C_{28}$ alkyl, R" is an aryl radical having 6 to 12 carbon atoms or an aliphatic radical having 1 to 30 carbon atoms, n is from 1 to 200 and m is 1 to 3 and (d) glass fibers.

11. A thermoplastic molding composition comprising a blend consisting essentially of a blend of (a) a bisphenol-A based homopolycarbonate, (b) a graft elastomer having a rubber core substantially of polybutadiene and a grafted phase consisting essentially of styrene and acrylonitrile, said polybutadiene content is about 5 to about 60 percent relative to the weight of said (b), (c) a polyanhydride conforming structurally to

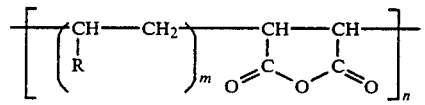

wherein R is a $C_{16}$ alkyl, m is 1 and n is about 145 and (d) about 10 to 25 percent relative to the total weight of said (a) plus (b) of glass fibers.

12. A thermoplastic molding composition comprising a blend of (a) an aromatic polycarbonate, (b) a graft elastomer which is characterized in having a rubber core substantially of polybutadiene and a graft phase which comprises styrene and acrylonitrile and in that its butadiene content is at least 5% relative to the weight of said graft elastomer, (c) a polyanhydride resin selected from the group consisting of (i) a linear copolymer of maleic acid anhydride and an α-olefin of the general formula

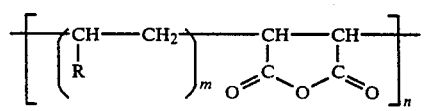

wherein R is a $C_{10}-C_{28}$ alkyl radical, n is from 1 to 200, and m is 1 to 3, and (ii) a linear copolymer of an imidized derivative of maleic acid anhydride and an α-olefin of the general formula

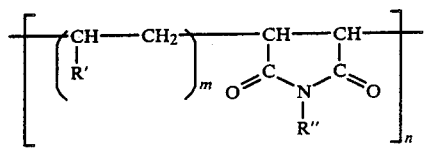

wherein R′ is a phenyl or a substituted phenyl radical or a $C_6$–$C_{28}$ alkyl, R″ is an aryl radical having 6 to 12 carbon atoms or an aliphatic radical having 1 to 30 carbon atoms, n is from 1 to 200 and m is 1 to 3 and (d) glass fibers, said composition being characterized in the absence of oligomeric ester plasticizers therefrom.

13. The composition of claim 11 wherein the weight ratio of said (a) and said (b) is between about 70/30 to about 30/70.

* * * * *